United States Patent [19]

Kaminski et al.

[11] 4,176,394
[45] Nov. 27, 1979

[54] APPARATUS FOR MAINTAINING A HISTORY OF THE MOST RECENTLY EXECUTED INSTRUCTIONS IN A DIGITAL COMPUTER

[75] Inventors: David G. Kaminski, West St. Paul; Mickiel P. Fedde, Apple Valley; Robert C. DeWard, Burnsville, all of Minn.

[73] Assignee: Sperry Rand Corporation, New York, N.Y.

[21] Appl. No.: 806,211

[22] Filed: Jun. 13, 1977

[51] Int. Cl.² ............................................. G06F 13/00
[52] U.S. Cl. ............................................. 364/200
[58] Field of Search ... 364/200 MS File, 900 MS File

[56] References Cited
U.S. PATENT DOCUMENTS

| | | | |
|---|---|---|---|
| 3,366,929 | 1/1968 | Mullery et al. | 364/200 |
| 3,396,371 | 8/1968 | Waldecker | 364/200 |
| 3,449,724 | 6/1969 | Boland et al. | 364/200 |
| 3,937,938 | 2/1976 | Matthews | 364/200 |
| 4,016,543 | 4/1977 | Franks et al. | 364/200 |

Primary Examiner—Gareth D. Shaw
Assistant Examiner—Michael C. Sachs
Attorney, Agent, or Firm—William D. Bauer; Kenneth T. Grace; Marshall M. Truex

[57] ABSTRACT

An apparatus for maintaining a history of instructions which have been most recently executed by a digital computer. A push-down stack is utilized for storing the contents of the program address counter, or the operand portion of the instruction register, of the computer upon the execution of every instruction and then pushing down the push-down stack whenever the last instruction executed by the digital computer was a branch type instruction. Provision may also be made for addressing the push-down stack so that the contents thereof may be reviewed in the order opposite from which it was loaded. This apparatus allows a user or diagnostic program to have access to the address of the most recently executed branch type instructions. In this way, a history of the most recently executed instructions can be maintained to aid hardware and software diagnostics.

3 Claims, 6 Drawing Figures

SAMPLE PROGRAM

| TIME (400) | ADDRESS (402) | INSTRUCTION (404) | PROGRAM MEMORY CENTER (406) |
|---|---|---|---|
| 1 | 0 | LOAD | 0 |
| 2 | 1 | BRANCH 10 | 1 |
| 6 | 2 | STORE | 2 |
| 7 | 3 | SUBTRACT | 2 |
| 8 | 4 | LOAD | 2 |
| 9 | 5 | BRANCH 13 | 3 |
|   | 6 | LOAD |   |
|   | 7 | ADD |   |
|   | 8 | STORE |   |
|   | 9 | BRANCH 0 |   |
| 3 | 10 | LOAD | 1 |
| 4 | 11 | ADD | 1 |
| 5 | 12 | BRANCH 2 | 2 |
| 10 | 13 | BRANCH 6 CONDITIONAL | 3 |
| 11 | 14 | ADD | 3 |
| 12 | 15 | STORE | 3 |
| 13 | 16 | BRANCH 0 | 4 |

*Fig. 5*

| STACK ADDRESS 410 | | TIME | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| 412 | 0 | 1 | 1 | 1 | 1 | 1 | 1 | 1 | 1 | 1 | 1 | 1 | 1 | 1 |
| 414 | 1 | — | 10 | 11 | 12 | 12 | 12 | 12 | 12 | 12 | 12 | 12 | 12 | 12 |
| 416 | 2 | — | — | — | — | 2 | 3 | 4 | 5 | 5 | 5 | 5 | 5 | 5 |
| 418 | 3 | — | — | — | — | — | — | — | — | 13 | 14 | 15 | 16 | 16 |
| 420 | 4 | — | — | — | — | — | — | — | — | — | — | — | — | 0 |
| 422 | 5 | — | — | — | — | — | — | — | — | — | — | — | — | — |
| 424 | 6 | — | — | — | — | — | — | — | — | — | — | — | — | — |

*Fig. 6*

APPARATUS FOR MAINTAINING A HISTORY OF THE MOST RECENTLY EXECUTED INSTRUCTIONS IN A DIGITAL COMPUTER

BACKGROUND OF THE INVENTION

When an error occurs in a digital computer operating a software program or series of programs, the fault is sometimes extremely hard to isolate. The digital computer error is sometimes either the result of a software fault or the result of a hardware fault, which is dependent upon certain software execution. In either case, it is critical to determine which instructions have most recently been executed by the digital computer at the time the error is discovered. If the last instructions executed by the digital computer are known, a large advantage is gained in isolating the instructions which were responsible for the software fault or the software instructions on which the hardware fault is dependent.

Prior art digital computer systems have previously encompassed a function known as breakpoint. In operation the breakpoint function checks the digital computer's memory references against a manually set predetermined address and detects whether the digital computer is requesting that particular address from memory. When a match between the digital computer's memory request address and the manually preset breakpoint address occurs, certain hardware action is taken. Generally, this action is either in the form of a halt, i.e., stopping the digital computer so that manual intervention can take over, or an interrupt, i.e., jump to a software diagnostic routine. As useful as the breakpoint function may be in a diagnostic environment, the breakpoint function is only useful in stopping or interrupting the digital computer once it has reached a certain address in program execution. The breakpoint function does not explain to the user or to the diagnostic program how the digital computer got to that point in the program, i.e., which series of software instructions and routines the digital computer executed before arriving at the manually preset breakpoint address.

An address recall system disclosed in the U.S. Pat. No. 4,016,543 granted to Franks, et al, entitled Processor Address Recall System, attacks the problem of determining the most recently executed instructions in a digital processor. The system disclosed in the Franks patent utilizes the previously described breakpoint function in conjunction with a memory stack for storing the addresses of the most recently executed instructions in the digital processor. The system operates by storing the address of every instruction executed by the digital processor in a memory stack and pushing down the push-down memory stack on the execution of every instruction. With a memory stack of 16 memory locations, this would give the user or diagnostic program the address of the 16 most recently executed instructions. The present invention differs from the memory address recall system disclosed in the Franks patent by maintaining a history of the addresses of only branch type instructions which have been most recently executed by the digital processor. The digital processor is known to sequence through instructions in consecutive order unless the instruction executed is a branch type instruction. The user or diagnostic program, in order to follow the exact sequence of instructions most recently executed by the digital processor, need not have the address of every instruction executed. The user or diagnostic program can construct the address of every instruction executed by referencing a list of the addresses of every branch type instruction executed. If the instruction executed is not a branch type instruction, it is a simple matter to follow the sequence of execution from the program listing. The only critical item that is necessary to be stored is the address of the branch type instructions. The present invention stores and maintains only the addresses of branch type instructions. This has the effect of widely expanding the history of most recently executed instructions. The same 16 location memory stack may be utilized instead of storing the 16 most recently executed instructions to store only the addresses of the 16 most recently executed branch type instructions and thereby gives access to the user or diagnostic program of a much much greater number of all instructions most recently executed.

SUMMARY OF THE INVENTION

The present invention relates to an apparatus for maintaining a history of which events have occurred most recently in a digital device. The digital device should be capable of performing a series of events consisting of a first type and a second type in which the events are controlled by means of the contents of an event register. The performance of an event of the first type changes the value of the contents of the event register in a predictable manner without reference to the event being performed. The performance of an event of the second type changes the value of the contents of the event register in a manner only predictable by reference to the event itself. The apparatus consists of a stack register containing a plurality of storage locations, each capable of holding the value of the contents of the event register and having a top position identifier. Also included are means coupling the event register into the input of the stack register for storing into the stack register at the one of the locations selected by the top position identifier, the value of the contents of the event register for every one of the events occurring in the digital device. Finally, the apparatus includes means coupled to the stack register for changing the top position identifier to the next one of the locations of the stack register when the event last occurring in the digital device was an event of the second type.

BRIEF DESCRIPTION OF THE DRAWINGS

The foregoing advantages, construction and operation of the present invention will become more readily apparent from the following description and accompanying drawings in which:

FIG. 5 is a sample program for illustrative operational purposes; and

FIG. 6 is a table showing the contents of the memory stack at various instants of time utilized, for illustrative purposes, with the sample program of FIG. 5.

DESCRIPTION OF THE PREFERRED EMBODIMENT

Digital computer errors are sometimes extremely difficult to isolate. These digital computer errors are usually the result of a software fault or the result of a hardware fault which is dependent upon specific software execution. In either of these cases, it is critical, in order to be able to quickly determine and isolate the fault, to ascertain which of the software instructions have been most recently executed by the digital computer at the time the fault is detected. If the instructions last executed by the digital computer can be quickly ascertained, the area of the software which has failed, or the software sensitive hardware fault, may be quickly determined. Absent this information, it is sometimes extremely difficult to trace backwards through a series of software executions to determine which software instructions precipitated the error.

The present invention solves this problem by providing a hardware memory stack for storing a finite number of addresses of the most recently executed branch type instructions, since the digital computer is known to perform a series of software instructions in a known and predetermined manner usually by sequential execution of consecutive addresses unless a program branch has occurred, it is unnecessary to store the address of every instruction most recently executed by the digital computer. If the address of every instruction which causes a branch in the normal sequence of instructions being executed is stored in the memory stack, reference may be had to the program listing of the software program currently being executed and those instructions executed prior to the branch may be ascertained.

This has particular advantage over storing the address of every instruction executed by the digital processor as taught in the aforereferenced Franks, et. al., patent. Because the digital processor may execute hundreds of non-branch type instructions, i.e., instructions which are executed serially out of consecutive sequential addresses, the present invention allows either a considerable savings in the amount of memory stack required to trace back through a given amount of software or, for a given amount of memory stack available, a considerably greater portion of software may be traced.

Figure 1:
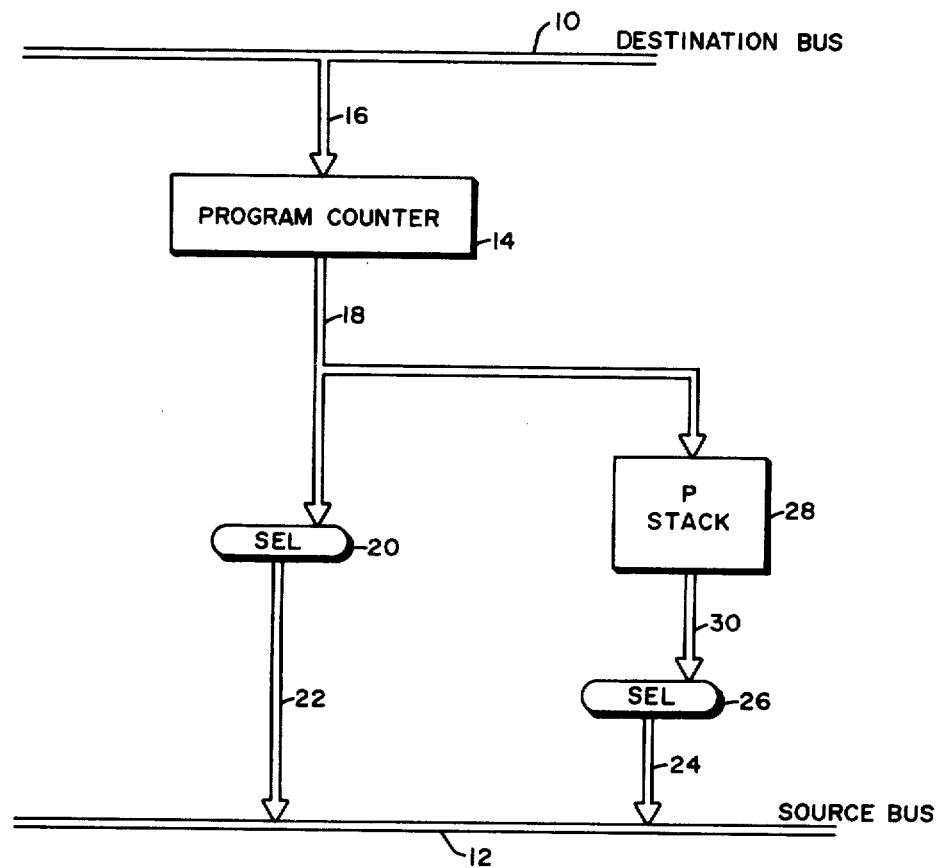
FIG. 1 is a general block diagram showing the environment in which the present invention is utilized.

The environment in which the present invention finds utilization may be more readily understood by reference to FIG. 1. FIG. 1 represents a portion of a digital computer of the type having two generalized data pussess. The first of these two busses is termed the destination bus 10 and is utilized in digital processor for data transfers in which a final or destination address is utilized. The second bus is termed the source bus 12 which is utilized in this digital processor environment for data transfers involving a source address. Briefly, this exemplary digital processor takes data from a device (not shown) coupled to the source bus and selected by a source address and transfers that data upon the source bus 12. The data is then operated upon according to an instruction contained in an instruction register and then deposited upon the destination bus 10 from where it is stored in a device (not shown) indicated by a destination address.

The program counter 14 in FIG. 1 stores the value of the address of the instruction which the processor is next going to execute. Note that the program counter 14 is loaded from the general destination bus 10. The program counter 14 is accessed by the processor through data path 18, selector 20 and finally data path 22 and onto the source bus 12. The selector 20 is shown in the block diagram illustrated in FIG. 1 to indicate the general nature of the computer environment. Presumably, some other element in the processor would also have access to the source bus 12 by way of data bus 22 to selector 20, although such device or element is not illustrated in FIG. 1. Similarly, another device or element may have access to the source bus 12 by way of data bus 24 through selector 26, although, again such device or element is not illustrated in the figure. In accordance with the present invention, the so-called program stack 28 is added to the digital processor and is connected in such a fashion so as to have access to the value contained in the program counter 14 and has access to the source bus 12. In this position, the program stack 28 may be loaded from the program counter via data path 18 and may be coupled to the source bus 12 via data path 30, selector 26 and data path 24. The value of the contents of the program counter 14 is loaded into the top of the program stack 28 every time an instruction is executed by this digital processor. If the instruction is not a branch type instruction, the value at the top of the program stack 28 is written over with the contents of the program counter 14 during the execution of the next instruction. However, if the last instruction executed by the digital processor was a branch type instruction, in addition to loading the value of the contents of the program counter 14 into the top of the program stack 28 via data path 18 the stack is pushed down one position. In this way that particular value of the program counter 14 is saved within the program stack 28 and the value of the program counter during the execution of the next instruction is loaded into the new top of program stack 28. In this manner, the value of the program counter 14 is saved within the program stack whenever the last instruction executed by the digital processor was a branch type instruction and the value of the program counter 14 is written over and lost in the top of the program stack 28 whenever the last instruction executed by the digital processor is a non-branch instruction.

The foregoing description of FIG. 1, illustrating in a general block diagram fashion the environment in which the present invention has application, is not meant to be restrictive, but is merely an illustrative embodiment of one environment in which the present invention may find utilization. Many variations and changes in environment within a digital processor may be made. For example, the present invention has equal application whether the address being saved is a microaddress within the digital processor or is a macroaddress indicating the address of the macroinstruction being executed by the software on the digital computer. The environment may be one-bus, two-bus or even a non-bus system. The system and processor elements shown in FIG. 1 are shown merely to indicate one environment. As long as the present invention has access to the address of the branch type instructions within the digital computer and is capable of being accessed itself, the subject invention may find utilization.

Figure 2:
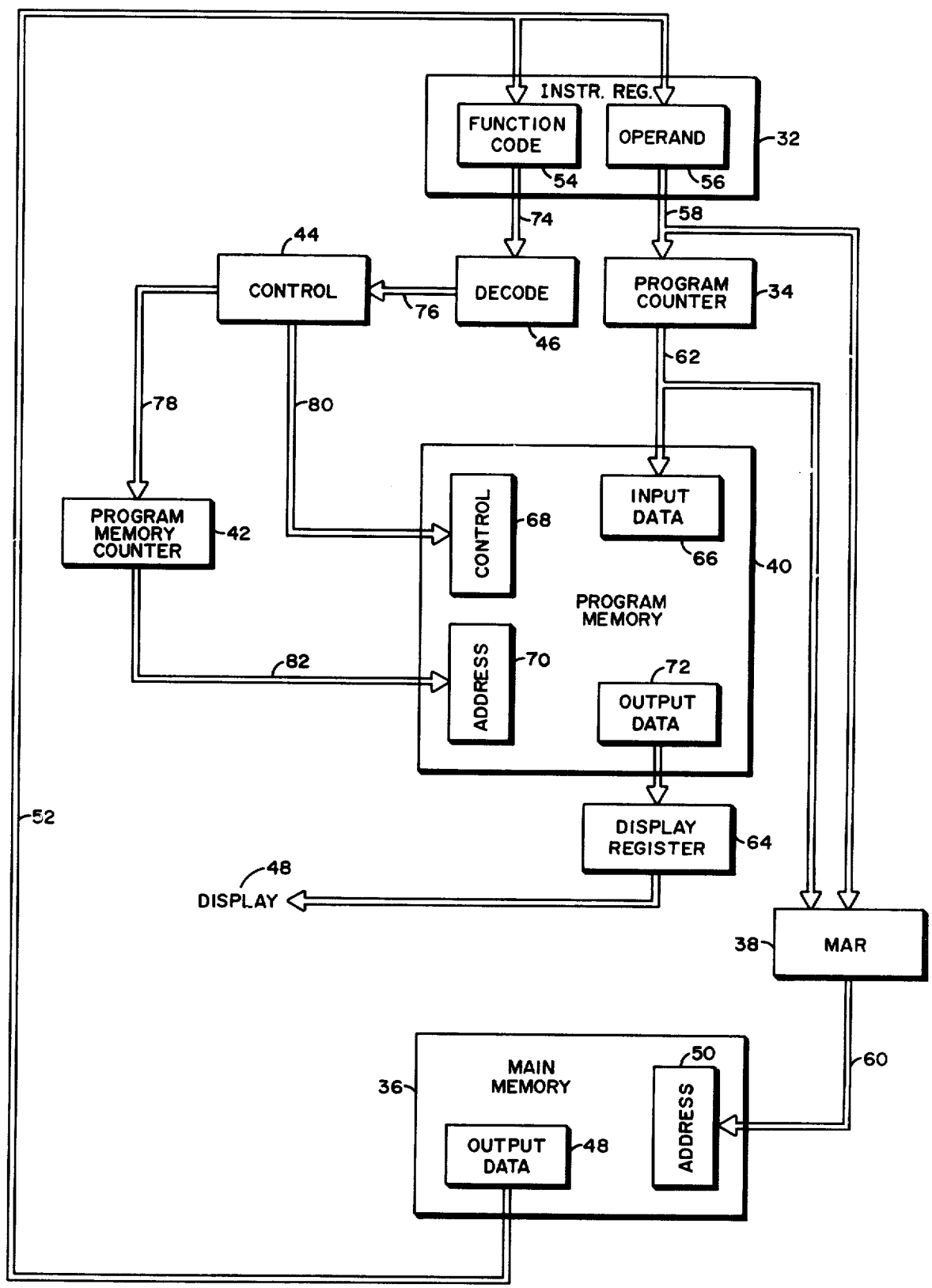
FIG. 2 is a detailed block diagram showing the operative parts of the present invention.

FIG. 2 illustrates a detailed block diagram of the functional elements in the present invention. The detailed block diagram represents a portion of existing logic in a digital processor and that logic which is added to form the operative elements of the present invention.

FIG. 2 illustrates in detail the connection and cooperation of the element, added for the present invention and those elements with which they cooperate in the existing digital processor environment. The instruction register 32, the program counter 34, the main memory 36 and the memory address register 38 represent conventional elements commonly found in digital processors. These elements are included in FIG. 2 in order to illustrate their operation in cooperation with the elements added to implement the present invention. The program memory 40, the program memory counter 42, the control element 44 and the decode element 46 as well as the display 48 all form a part of the elements which are added to the existing digital processor circuitry to make the present invention operative.

In FIG. 2, the main memory 36 is utilized to hold the instructions to be executed by the digital processor. The main memory 36 is shown as being composed of an output section 48 and an input address section 50. In addition, the main memory contains input data storage and control sections which are not illustrated in FIG. 2. An instruction to be executed by the digital processor is obtained from main memory 36 by transferring the instruction through the output data section 48 along data bus 52 and into the instruction register 32. The instruction contained in instruction register 32 is illustrated as containing two components, a function code portion 54 and an operand portion 56. The function code portion 54 of the instruction contained in the instruction register 32 contains information as to the type of instruction to be executed. There are many different types of instructions, for example, a load instruction, a store instruction, an add instruction, and a jump instruction. These, of course, are merely a few examples of the possible instruction types available. Of all the exemplary types available, all are nonbranch type instructions except the jump instruction. The jump instruction is a branch type instruction since execution of the jump instruction will cause the digital processor to go to an address other than the next consecutive address to get an instruction for execution. The operand portion 56 of the instruction contained in the instruction register 32 is utilized generally as the address upon which the instruction is to operate. For example, with a load instruction the operand portion 56 would indicate the address of the data that was to be loaded. With a jump instruction the operand portion 56 indicates the jump address, i.e., the address to which the program is to jump and begin sequential execution anew. In either case, i.e., a nonbranch or branch type instruction, the operand portion 56 is transferred along data bus 58 to the memory address register 38. The contents of the memory address register 38 is then inputted to the main memory 36 along data bus 60 into the input address section 50 of the main memory 36. From here the next instruction may be obtained and the process started anew. If the instruction contained in the instruction register 32 is a branch type instruction, i.e., a jump instruction, the operand portion 56 is also utilized by being loaded into the program counter 34. This changing of the program counter 34 causes the jump or branch of the program being executed by the digital computer. After the program counter 34 has been modified and the next instruction has been executed, the address for the next sequential instruction to be executed by the digital processor is obtained from the program counter after the program counter 34 has been incremented. This value in the program counter 34 is transferred along data bus 62 into the memory address register 38. The memory address register 38 then supplies that address to the main memory 36, as previously indicated, to obtain the next instruction to be executed by the digital processor. The foregoing description is meant to be descriptive of an exemplary manner in which the basic parts of a digital processor involving the instruction register, the program counter and the memory including the memory address register may be connected and in which they may operate. Various changes, modifications and improvements in the suggested exemplary connection and operation may be made by those with ordinary skill in the art without departing from the present scope and practice of the present invention.

With the circuitry described thus far in FIG. 2 the digital processor would execute a series of instructions and after execution a user or diagnostic program could not tell exactly which instructions had been executed by the digital processor. The addition of the following elements in FIG. 2 serve to provide a history to a user or a diagnostic program of which instructions have been most recently executed by the digital processor.

The program memory element 40 in FIG. 2 consists of an input data section 66, a control section 68, an input address section 70 and an output data section 72. In addition the program memory 40 contains a storage section not explicitly illustrated. The program memory 40 is operatively connected to the existing components of the digital processor to store the value of the contents of the program counter 34 whenever the last instruction executed by the digital processor was a branch type instruction. This data is received by program memory 40 from the program counter 34 via data bus 62 into the input data section 66 of the program memory 40.

A decode element 46 is connected to the function code portion 54 of the instruction register 32. The decode element 46 receives the bits comprising the function code of the instruction currently being executed via data path 74 and performs one simple and straight-forward decode function. The function of the decode element 46 is to determine whether the instruction contained in the instruction register is a branch or a non-branch instruction. This determination is transmitted from the decode element 46 along signal line or lines 76 to control element 44. In a very simple illustration of the operation of decode element 46, signal line 76 would merely be a single data line. Decode element 46 would transmit a logical high over signal line 76 if the function code portion 54 of the instruction register 32 indicated that the instruction currently being executed, i.e., the instruction contained in the instruction register, is a branch type instruction and would transmit a logical low along signal line 76 in the function portion 54 of the instruction register 32 indicated that the instruction currently being executed was a non-branch instruction. It is to be emphasized here that the exact nature of the function codes contained in the function code portion 54 is not pertinent to the successful operation of the present invention. The present invention need not be limited to any single set of function codes and it is only necessary here to indicate that for whatever set of function codes that may exist in the field 54 of the instruction register 32, that the decode element 46 must distinguish between branch type function codes and non-branch function codes.

A simple example may aid in the understanding. Assume an instruction repertoire consisting of four function codes as follows: function code 00 for a "load"

instruction, function code 01 for an "add" instruction, function code 10 for a "store" instruction and function code 11 for a "jump" instruction. In this limited example, decode element 46 would transmit a low along signal line 76 indicating a non-branch condition whenever function codes 00, 01 and 10 were present in the function code portion 54 of the instruction register 32. When the 11 function code existed in the function code portion 54 of the instruction register 32, the decode element 46 would transmit a logical high along signal line 76 indicating that the instruction currently being executed was a branch type instruction. The logic circuitry for decoding function codes is well known by those having ordinary skill in the art and need not be explicitly described.

Control element 44 receives the signal from the decoder 46 indicating whether the instruction currently being executed by the digital processor is a branch or non-branch type instruction. The control element then acts upon the program memory counter 42 and upon the program memory 40, via the control section 68. It is the function of the control element 44 to provide both control and timing signals to the program memory counter 42 and the program memory 40. The exact nature, number and format of these control and timing signals, of course, depends upon the exact configuration of logic circuitry utilized for the program memory counter 42 and the program memory 40. The control element 44 functions to control the program memory 40 by causing the data present in the input data section 66 to be stored into the storage section of the program memory 40 every time an instruction is executed by the digital processor. Further, control element 44 serves to control the program memory counter 42 by incrementing the program memory counter 42 every time the instruction being executed by the digital processor, relying on information provided by the decode element 46, is a branch type instruction. When the program memory counter 42 is incremented, that data is transmitted along data line 82 to the input address section 70 of the program memory 40. The program memory counter 42 controls the address in the program memory at which the data received from the input data section and from the program counter 34 is stored. If the instruction being executed by the digital processor is a non-branch instruction as that information is supplied from the decode element 46, the program memory counter 42 is not incremented by the control element 44 and the data present in the input address section 70 of the program memory 40 remains the same and the address location in the program memory 40 is written over with the new data supplied to the input data section 66 when the next instruction is executed by the digital processor. In this manner, the program memory 40 retains only those addresses supplied to it from the program counter 34 when the last instruction executed was a branch instruction. The exact circuitry needed to implement the control element 44 is not illustrated but it is well within the abilities of one having ordinary skill in the art to construct a logical circuit implementing control element 44 to control the write functions and the increment functions.

Thus far, the input data section 66 of the program memory has been illustrated and described as being connected to the output of the program counter 34. Connected in this manner the program memory 40 receives as data, the address stored in the program counter, i.e., the address of the next instruction to be executed by the digital processor. It is to be noted, however, that an alternative connection may be made with equally successful results. The input data section 66 of the program memory may be connected to the output of the operand portion 56 of the instruction register 32. In this manner, the program memory receives the address as specified by the operand portion 56 of the instruction contained in the instruction register 32 instead of the address of the program counter 34. However, the only time in which the data is retained in the program memory 40 and not written over by new data is when the instruction last executed by the digital processor is a branch type instruction. In that case, the data contained in the operand portion 56 of the instruction register 32 is transferred to the program counter 34 and loaded. The data available in the program memory 40, however, will be the branch address, i.e., the address at which the program will resume sequential execution of consecutive addresses, and not the address of the branch instruction. During the execution of the branch type instruction the data contained at the output of the program counter 34 and the data contained at the output of the operand portion 56 of the instruction register 32 is identical. In FIG. 2, the input data section 66 may, in the alternative, be connected to the output of the operand portion 56 of the instruction register 32 instead of the output of the program counter 34. If that alternative connection were made the input of the program counter 34 would still also be connected to the output of the operand portion 56 of the instruction register 32.

The circuitry described thus far includes all of the circuitry necessary to record and store a history of the most recently executed instructions in the digital processor. However, additional elements may be added to the circuitry in order to access the program memory 40 and read the contents thereof. The display register 64 is shown connected to the output data section 72 of the program memory 40. The control elememt 44 may issue decrement commands to the program memory counter 42 whenever the contents of the program memory 40 is to be reviewed in the opposite order in which it was stored. In this manner then the user or diagnostic program of the digital processor may review the addresses giving a history of the instructions most recently executed in the most recent to less recent order.

A further embodiment of the present invention may also include separate means for loading the program memory counter 42 with data from an external source such that the contents of the program memory 40 may be accessed at any point and in any order. Such separate loading path of the program memory counter 42 is not illustrated in FIG. 2. The display register 64 may be connected to a display 48 which provides a visual presentation of the contents of the display register 64.

Figure 3:
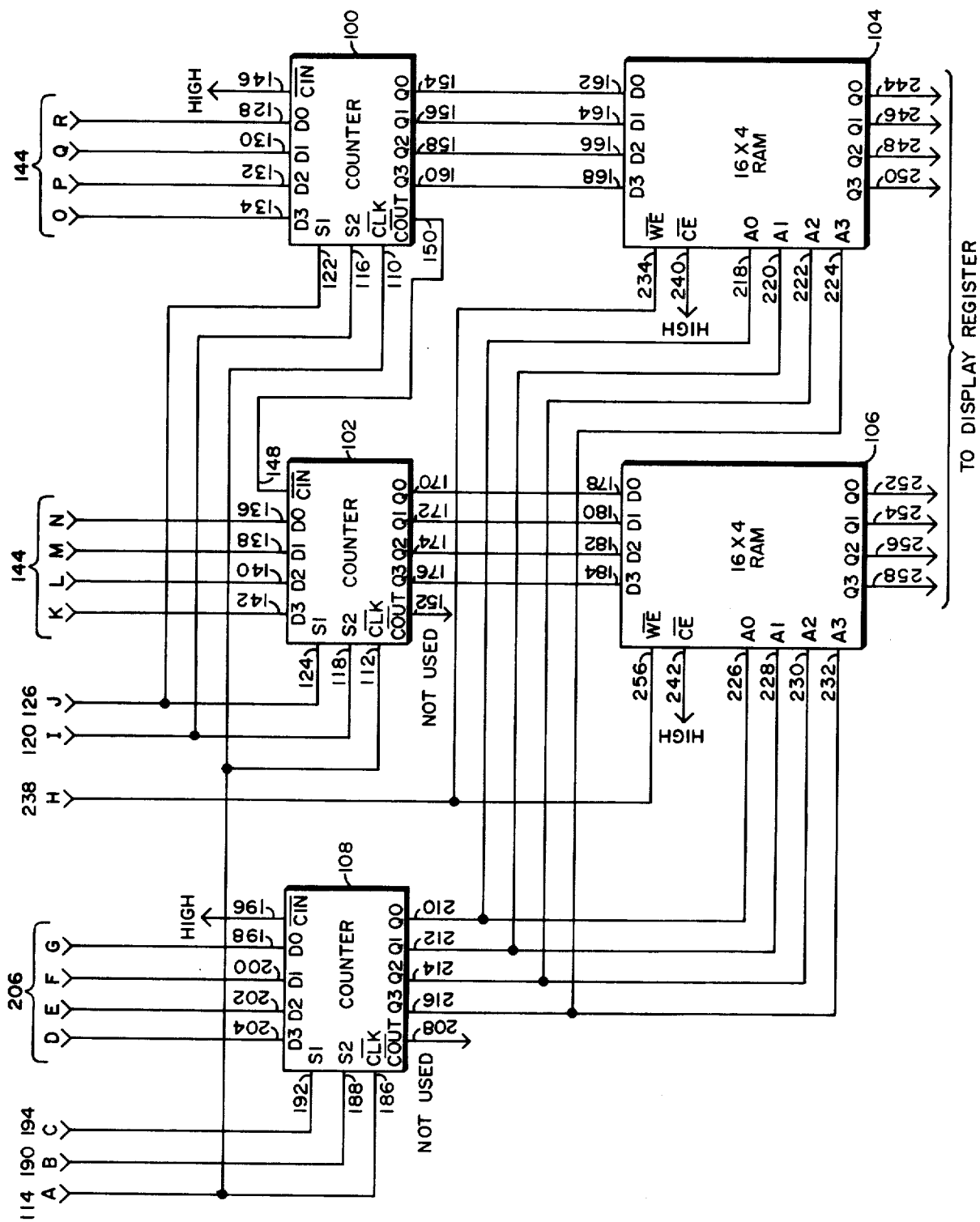
FIG. 3 is a schematic diagram of the present invention.

FIG. 3 is a detailed schematic diagram showing the program counter 34, the program memory 40 and the program memory counter 42 of FIG. 2. In FIG. 3 the program counter is represented by circuit elements indicated by reference numerals 100 and 102. The program memory is represented by circuit elements indicated by reference numerals 104 and 106. And, finally, the program memory counter is represented by circuit element indicated, by reference numeral 108. Circuit elements 100, 102 and 108 in FIG. 3 may be constructed out of any commonly available commercial counter circuit manufactured by several integrated circuit manufacturers. A specific example of one circuit which could be used for elements 100, 102 and 108 is the Motorola MC10136 Universal Hexadecimal Counter, MECL 10,000 Series, as described at page 3-102 et seq. of the *MECL Integrated Circuits Data Book*, Third Edition, September 1973, published by the Motorola Semiconductor Products, Inc. Circuit elements 104 and 106 may be constructed out of any commonly available 16×4 bit random access memory element manufactured by several different integrated circuit manufacturers. A specific example of a circuit which could be used for elements 104 and 106 is the Motorola MC10145 64-bit Register File (RAM), MECL 10,000 Series, as described at page 3-116, et seq., of the *MECL Integrated Circuits Data Book*, Third Edition, September 1973, published by Motorola Semiconductor Products, Inc.

Inputs 110 and 112 of circuit elements 100 and 102, respectively, the $\overline{CLK}$ input, are connected together and to a data input 114 to FIG. 3. Inputs 116 and 118 to circuits 100 and 102, respectively, the SR input, are connected together and represent data input 120 to FIG. 3. Inputs 122 and 124 of circuit elements 100 and 102, respectively, the S1 input, are also both connected together and represent data input 126 to FIG. 3. Inputs 128, 130, 132 and 134 to circuit 100 and inputs 136, 138, 140 and 142 to circuit 102 are all brought in separately to FIG. 3 and collectively represent input 144 to FIG. 3. Input 146 to element 100, $C_{in}$, is connected directly to a logical high. Input 148 to circuit element 102, $\overline{C_{in}}$, is connected to output 150 of circuit element 100, the $\overline{C_{out}}$, output 152 of circuit element 102, $\overline{C_{out}}$, output is not used.

Outputs 154, 156, 158 and 160 of circuit element 100, the data or Q outputs, are individually connected to inputs 162, 164, 166 and 168 of circuit element 104, the data or D inputs, respectively. Similarly outputs 170, 172, 174 and 176 of circuit element 102 the data or Q outputs, are individually connected to inputs 178, 180, 182 and 184 of circuit element 106 the data or D inputs, respectively.

Input 186 of circuit element 108, the $\overline{CLK}$ input, is connected, along with inputs 110 and 112 previously described, to input 114 to FIG. 3. Input 188 of circuit element 108, the S2 input, is connected to input 190 to FIG. 3. Input 192 to circuit element 108, the S1 input, is connected to input 194 to FIG. 3. Input 196 of circuit element 108, $\overline{C_{in}}$, input is connected directly to a logical high. Inputs 198, 200, 202 and 204 to circuit element 108 are individually brought out of FIG. 3 as inputs and are collectively known as data inputs 206. Output 208 of circuit element 108, the $\overline{C_{out}}$ output, is not utilized. Outputs 210, 212, 214 and 216 of circuit element 108, the data or Q outputs, are individually connected to inputs 218, 220, 222 and 224 of circuit element 104, respectively, and also to inputs 226, 228, 230 and 232 of circuit element 106, respectively, the address or A inputs, to circuit elements 104 and 106. Inputs 234 to circuit 104 and 236 to circuit 106, $\overline{WE}$ input, are connected together and are connected to input 238 to FIG. 3. Input 240 to circuit 104 and 242 to circuit 106, the $\overline{CE}$ input, are both connected directly to a logical high. Outputs 244, 246, 248 and 250 to circuit element 104 and outputs 252, 254, 256 and 258 to circuit element 106, the data or Q outputs, are individually connected to whatever display mechanism is utilized.

Figure 4:
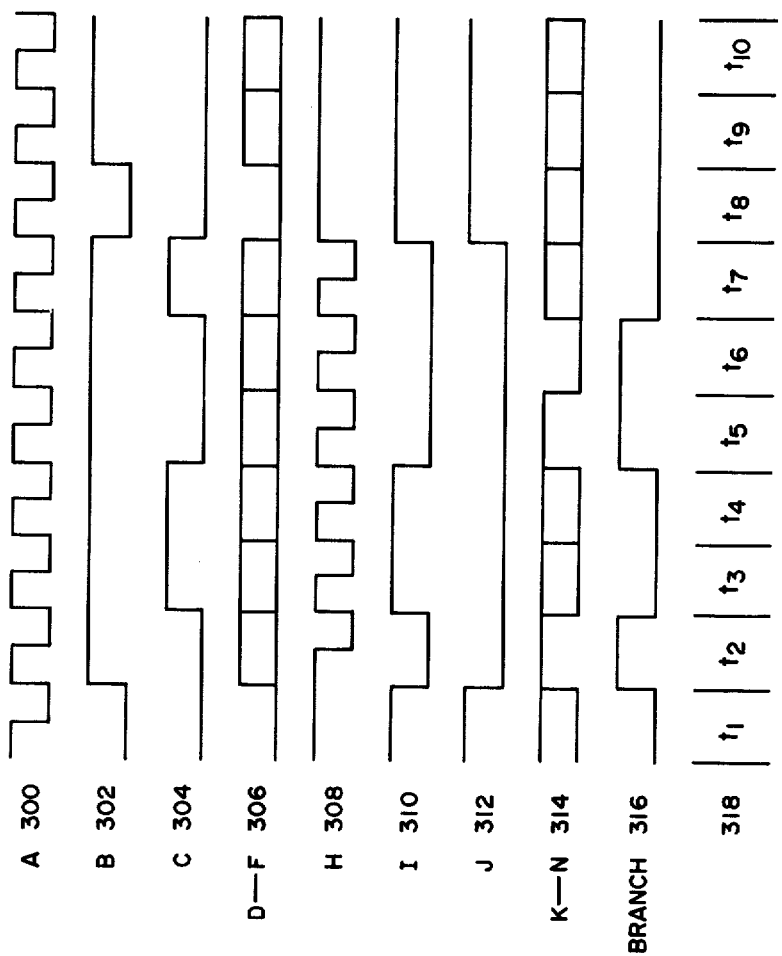
FIG. 4 is a timing diagram illustrating the signals used in the circuit of FIG. 3.

The operation of the counters and ramdom access memory circuits connected as described above may be more readily understood by reference to FIG. 4 which contains waveform diagrams of the inputs to FIG. 3. The waveform inputs to FIG. 3, in addition to being labeled with reference numerals, have been labeled with a single letter. The letters corresponding to waveforms 300, 302, 304, 306, 308, 310, 312 and 314 in FIG. 4 correspond directly to the letters utilized to identify the data inputs 114, 120, 126, 144, 190, 194, 206 and 238 in FIG. 3. For example, the waveform labeled A indicated by reference numeral 300 in FIG. 4 is the signal which would be connected to input 114 in FIG. 3. A similar correlation exists for all of the other signals. In addition, FIG. 4 contains waveform 316 which is a signal that is not present in FIG. 3. The waveform 316 is an indication that the instruction present in the instruction register is a branch or is a non-branch type instruction. This is the signal which would be present on signal line 76 in FIG. 2 from decode element 46. It is in FIG. 4 to indicate that it is an input to control element 44 in FIG. 2 so that control element 44 may produce the waveforms 300 through 314 to control the operation of the program memory counter 42 and the program memory 40 in FIG. 2.

FIG. 4 also contains a series of time divisions indicated by reference numeral 318. FIG. 4 is a representation of the waveform of the various signals with time increasing from the left to right in the diagram. These time intervals 318 are labeled $t_1$ through $t_{10}$.

Waveform A in FIG. 4 represents a clock signal of a predetermined regularly occurring frequency. It is used for timing the circuitry contained in FIG. 3 to indicate, every time an instruction is executed by the digital processor. Waveforms 302 and 304, signals B and C, control the operation of circuit element 108 in FIG. 3 which represents the program memory counter 42 of FIG. 2. Waveform 306, signals D through F, control the data input into circuit element 108 in FIG. 3 and would represent the data to be loaded into the program memory counter 42 in FIG. 2 if a manual load into that counter was desired. Waveform 308, signal H, controls the write operation into circuit elements 104 and 106 which represent the program memory 40 in FIG. 2. Waveforms 310 and 312, signals I and J, control the operation of circuit elements 100 and 102 in FIG. 3 which represent the program counter 34 in FIG. 2. Waveform 314, signals K through N, control the data to be loaded into elements 100 and 102 in FIG. 3 and represents the loading of a branch address into the program counter 34 in FIG. 2. Waveform 316 represents the output of decode element 46 in FIG. 2 and represents whether or not the current instruction being executed by the digital processor is a branch type instruction.

Waveform 300 goes through one complete cycle for each instruction executed by the digital processor. Thus, each time period from $t_1$ through $t_{10}$ an instruction is executed by the digital processor. At time $t_1$ waveforms 301 and 304 are both low which will cause the loading of circuit elements 108 with the data present at the D inputs to that circuit. Waveform 306 represents the data present on the D inputs to circuit element 108 in FIG. 3 and thus the element 108 is loaded with all lows. Waveform 308 is a high, inhibiting any writing in circuit elements in 104 and 106 during this time period. Waveforms 310 and 312 are both high, indicating that elements 100 and 102 are in stable and holding condition. Since elements 100 and 102 are not being loaded, waveform 314 is in a "don't care" condition during this time. Since this time period $t_1$ is basically an initialization time period, a branch type instruction is not indicated to be present (waveform 316 is low).

At time $t_2$ in FIG. 4 the first branch instruction is executed by the digital processor. The control unit sets waveform 302 to a high and continues waveform 304 in a low. This high/low condition on waveforms 302 and 304 cause element 108, the program memory counter, to increment. Since element 108 is not being loaded, waveform 106 indicates a "don't care" condition. Because an instruction is being executed by the digital processor, waveform 308 is a low, indicating that circuit elements 104 and 106, the program memory, is being loaded with the data contained in elements 100 and 102, the program counter. Since the instruction is a branch type instruction the branch address must be loaded into elements 100 and 102. Thus, waveforms 310 and 312 are in a low condition, loading whatever data is contained on waveform 314.

During time periods $t_3$ and $t_4$ non-branch type instructions are being executed by the digital processor. During this time period both waveforms 302 and 304 are in a high condition, holding the value of the program memory counter with no incrementation. Again, the data on the input to the program memory counter, waveform 306, does not matter. Since an instruction is being executed by the digital processor, again waveform 308 is a low during both time periods. Thus, the data contained in the program counter, elements 100 and 102 in FIG. 3, is being loaded into the program memory 104 and 106 in FIG. 3. However, note that during this time period, the value contained in elements 108, the program memory counter, has not been changed. Thus, the address information is rewritten on top of the previous contents every time a non-branch instruction is executed. Waveforms 310 and 312 are in a high and low condition, respectively, indicating that the program counter must be incremented in order to serially access sequential instructions from memory. Waveform 314 indicates a "don't care" condition, since the program counter, elements 100 and 102, is not being loaded.

Operation during time periods $t_5$ and $t_6$, each containing branch type instruction execution, are identical to that which occurs during time period $t_2$. Note, however, that the information written into the circuit elements 104 and 106, the program memory, at time periods $t_3$ and $t_4$ are written over with the new data obtained at time period $t_5$. However, the data written at time period $t_5$ is not written over since the program memory counter, element 108 in FIG. 3, is incremented, thus addressing a new location in the program memory elements 104 and 106 in FIG. 3.

Time period $t_7$ again represents the execution of a non-branch instruction and the operation during this time period is identical to the operation during time periods $t_3$ and $t_4$. Taken together, time periods $t_2$ through $t_7$ indicate the circuits' operation during the normal execution of branch and non-branch instructions by the digital processor.

Time periods $t_8$ through $t_{10}$ represent one method in which the contents stored in the program memory may be read out or accessed. At time period $t_8$, the control element has modified the waveforms such that waveform 308 is high no longer writing data into the program memory, elements 104 and 106. Waveforms 302 and 304 are set low, causing the data contained on waveform 306 to be loaded into the program counter circuit element 108. Thus, the program memory counter may be loaded so that the program memory may be accessed starting at any location. The waveforms 310 and 312 are both high during $t_8$ through $t_{10}$, indicating that the program counter is not being loaded. Waveform 314 during $t_8$ through $t_{10}$ indicates a "don't care" condition since the counter is not being loaded. Waveform 316 indicates a non-branch instruction condition since instructions are not being executed by the digital processor during $t_8$ through $t_{10}$.

After the program memory counter, circuit element 108, has been loaded during $t_8$, the control unit modifies the levels of waveforms 302 and 304 to a high and low level, respectively thus controlling circuit element 108 in an increment condition. This incrementation during time periods $t_9$ and $t_{10}$ will cause the program memory counter to step through the program memory and access the contents of the program memory, circuit elements 104 and 106, in a first in, first out manner. Waveform 306 indicates a don't care condition during the time period since the program counter is not being loaded. Thus the circuit elements 104 and 106, representing the program memory, are being accessed so that either the user of the digital processor or a diagnostic program operating within the digital processor may have access to the addresses stored therein and be able to trace the operation of the software executing in the digital processor.

An alternative mode of operation during time periods $t_8$ through $t_{10}$ would be to cancel the load operation on the program memory counter at $t_8$ and instead set waveforms 302 and 304 to a low and high condition, respectively, thus indicating to circuit element 108 that a decrement operation was to be performed. In this manner the last location stored in the circuit elements 104 and 106, representing the program memory is accessed first. The program memory counter then decrements through the previously stored values. Thus, the user of the digital processor or the diagnostic program operating in the digital processor may have access to the addresses stored therein in the opposite order from which they were stored. All other aspects of the circuit's operation remain the same.

Reference should now be given to FIG. 5 which contains a sample program which will be explained for an illustrative example of how the above described circuitry can maintain a history of those instructions previously executed by the digital processor. FIG. 5 contains a sample program and contains four columns. Column 400, labeled time, indicates merely the sequence of execution of each of the instructions contained in the sample program. Column 402, labeled address, contains the address at which the sample instructions are stored in memory. Column 404, labeled instruction, indicates the general nature of the instructions stored at the addresses in column 402. Note that the operand address of non-branch instructions, being immaterial to the sequential operation of the instructions, are omitted. Column 406, labeled program memory counter, indicates the value of the program memory counter at each step in the sequential execution of this sample program.

Assuming that the processor starts execution at address 0, indicated by time $t_1$, the processor first executes the load instruction with the program memory counter equal to 0. The program continues sequentially at time 2 to address 1 where a branch to address 10 instruction is executed. Since the instruction at this address is a branch instruction, the program memory counter is incremented and now reads 1. At time 3 the program execution jumps to address 10 and executes a load instruction. Since the load instruction is a non-branch instruction, the program memory counter remains at 1. The program continues sequentially at times 4 and 5 through addresses 11 and 12 executing first an add instruction and then a branch to address 2 instruction. The program memory counter on the add instruction is kept at address 1 but the counter is incremented at time 5 since the instruction executed was a branch type instruction. At time 6 the instruction at address 2, a store instruction is executed followed by the instructions located at addresses 3 and 4 at times 7 and 8, respectively. All three of these instructions are non-branch type instructions and the program memory counter is not incremented. At time 9 and address 5 another branch type instruction, branch to address 13, is executed. At this time the program memory counter is again incremented, now to a value of 3. At time 10 the instruction at address 13 is executed. The instruction at address 13 is a conditional branch to address 6. It is assumed at this point that the condition necessary to cause the branch operation does not exist and the branch does not occur. This is indicated as a non-branch instruction. The branch did not actually occur. Thus, the program memory counter is not incremented. The instructions at addresses 14 and 15 are executed at times 11 and 12, respectively, both being non-branch instructions. Finally, at time 13, the instruction at address 16 is executed, a branch to address 0. Again, since this is a branch type instruction the program memory counter is incremented for the fourth time. With the branch to address 0 the operation of the sample program begins its second cycle.

The operation of the present invention may be more readily understood by reference to FIG. 6 which contains an illustration of the contents of the program memory at the times labeled 1 through 13 during the execution of the sample program from FIG. 5. In FIG. 6, the contents of the various addresses of program memory are indicated by row with the program memory address being labeled in column 410. Row 412 contains the contents of program memory address 0, column 414 contains the contents of program memory address 1 and so on through row 416, 418, 420, 422 and finally row 424 which contains the contents of program memory address 6. The times indicated at row 426 correspond to the those times listed in column 400 in FIG. 5. Again, sequencing through the sample program of FIG. 5 with reference to the data in FIG. 6, at time 1 the program memory counter is addressing program memory address 0 (row 412 in FIG. 6). The program counter at that time, being one ahead of the instruction actually being executed, is loaded into program memory address 0. At time 2 the instruction at address 1, namely the branch to address 10 instruction, is being executed. The program counter at that time has been incremented to the value of 2 indicating that the instruction at address 2 is the next instruction to be executed. However, because the instruction at address 1 is a branch instruction the program counter is instead loaded with the operand address of the branch instruction, namely 10. At the same time the program memory counter is incremented to address 1. Therefore, at time 2 the program memory counter is incremented to 1 and the value of 10 is stored at program memory address 1, represented in FIG. 6 by row 414. Since the program memory counter has been incremented by 1 the previous value stored at program memory address 0, represented by row 412 remains unchanged and is indicated in FIG. 6 as a 1. This value will now no longer be modified since the program memory counter has been incremented and now addresses a different storage location within the program memory. At time 3 the load instruction at address 10 is incremented and since that instruction is a non-branch type instruction, the program memory counter is not incremented. However, the program counter is incremented so that the processor may prepare to read up the next instruction to be executed. This instruction at address 11 is then executed at time 4 and, again, since it is a non-branch type instruction, the program memory counter is, again, not incremented and the value stored at program memory address 1 is rewritten, this time with a value of 12, indicating that the instruction at address 12 is the next instruction to be executed. At time 5, the branch to address 2 instruction, located at program memory address 12, is executed and the program memory counter is incremented, this time to a value of 2. The program counter is loaded with the contents of the operand address of the branch instruction, namely 2 and a value of 2 is stored at program memory address location 2 represented in FIG. 6 by row 416. Note that the value contained at program memory address 1 is maintained just as the value contained at program memory address 0 was maintained since the program memory counter was incremented in that a branch instruction was being executed. At time 6, 7 and 8 the non-branch instructions at address 2, 3 and 4 are executed and those addresses are temporarily stored and written over at address 2 in program memory. Again, at time 9, a branch to address 13 instruction is executed at address 5. The program memory counter is incremented for the third time and the value of 5 is maintained in program memory at program memory address 2. The program at time 10 jumps to address 13 to execute the conditional branch to address 6 instruction. Since it is assumed that the conditional branch condition is not satisfied, the program falls through to address 14. Because the conditional branch condition was not satisfied, the decode logic does not recognize that instruction as a branch type instruction and the program memory is stored just as if the instruction were some other type of non-branch instruction. Similarly, during times 11 and 12 non-branch instructions at address 14 and 15 are executed. Finally, at time 13 the branch to address 0 instruction at address 16 is executed at which time the program memory counter is incremented for the fourth time and the value of 0 is loaded into the program counter. With the program memory counter incremented to the value of 4 the value of 16 is maintained in program memory address 3. This sample program then repeats itself.

An examination, then, of the contents of program memory at time 13 will reveal that the most recently executed instructions can be readily ascertained in conjunction with reference to the sample program listing in FIG. 5. In order to determine the most recently executed instructions, the last address in the program memory, that is the address contained in the program memory counter, is the address of the last instruction executed by the digital processor. In this case the last instruction executed was the instruction at address 0. We now reference the next previous address in program memory and note that the instruction at address 16 was the last branch type instruction executed. A reference to address 16 in the program listing of FIG. 5 shows that the instruction is a branch to address 0. We now know that the digital processor has last executed the instruction at address 0 and since the instruction at address 16, or the branch to 0 instruction was the next most recently executed instruction that no other instruction execution intervened. Reference to program memory address 2, the next most recently stored address in program memory, shows a value of 5. This represents the address of the next most recently executed branch instruction. Referring to the program listing in FIG. 5, it may be noted that the instruction at address 5 is a branch to address 13. We now know that the program executed the branch to address 13 instruction and thereafter executed the instruction at address 13, 14 and 15 prior to the execution of the branch instruction at address 16. Similarly, references to program memory address 1 and then program address 0 will yield similar results.

Thus, it can be seen that there has been shown and described a novel apparatus for maintaining a history of the instructions most recently executed by a digital processor without the necessity of maintaining an exhaustive list of every instruction executed by the digital processor. It is to be understood, however, that various changes, modifications, substitutions in the form of the details of the described apparatus can be made by those skilled in the art without departing from the scope of the invention as defined by the following claims.

What is claimed is:

1. In a digital computer capable of executing instructions and of the type having a program address register for holding the address of the next instruction to be executed, said instructions containing a function code portion and an operand address portion and at least one of said instructions being capable of causing a branch to a program address not in succession with the last program address and containing a main memory for storing said instructions, an apparatus for maintaining a history of which of said instructions have been executed by said digital computer, comprising:

an instruction register for holding the instruction currently being executed by said digital computer and coupled to said main memory for receiving said instructions from said main memory;

decoding means coupled to a portion of said instruction register containing said function code portion for decoding the instruction type and for providing a signal of a first binary significance when the function code portion of said instruction designates a branch instruction and of the opposite binary significance when said function code portion specifies a non-branch instruction;

an incrementable program address register coupled to the portion of said instruction register holding said operand address portion for temporarily holding the address of the next instruction to be executed by said digital computer;

a set of registers whose data inputs are coupled to the output of said portion of said instruction register containing said operand address portion each of said registers capable of holding the value of the contents of said operand portion of said instructions;

an incrementable counter register whose output is coupled to said set of registers for selecting one of said set of registers based upon the value of the contents of said counter registers; and control means coupled to the output of said decoding means and to said set of registers for causing the contents of said operand portion of said instruction register to be stored in the selected one of said set of registers upon the execution of each instruction by said digital computer and for incrementing the value of the contents of said counter register whenever said decoding means produces a signal of said first binary significance;

whereby a history is maintained of which of said instructions have been most recently executed.

2. An apparatus as in claim 1 which further comprises:

display means coupled to the contents of said set of registers for reading the value of the contents of the selected one of said set of registers; and said control means further including means for decrementing the value contained in said counter register, such that the contents of said set of registers may be reviewed in the reverse order from which they were stored.

3. In a digital computer capable of executing a series of instructions called a program, in which said instructions are each addressable by a program address register, an apparatus for maintaining the history of which of said instructions in said program have been executed most recently by said digital computer, comprising:

a set of registers, each capable of holding the value of the contents of said program address register;

a pointer register whose output is connected to said set of registers such that a unique value in said pointer register will uniquely select one of said set of registers;

means connected to said program address register and to the input to said set of registers for storing into the selected one of said set of registers, the value of the contents of said program address register for every one of said instructions executed by said digital computer;

means coupled to said pointer register for incrementing the value contained in said pointer register whenever the instruction last executed by said digital computer was determined to be a branch instruction;

display means coupled to the output of said set of registers for reading the value of the contents of the selected one of said set of registers; and means coupled to said pointer register for decrementing the value contained in said pointer register such that the value of the contents of each of said set of registers may be reviewed in the opposite order from which they were scored;

whereby a history is maintained of which of said instructions of said program have been most recently executed.

* * * * *